US011220228B2

(12) United States Patent
AminiKashani et al.

(10) Patent No.: US 11,220,228 B2
(45) Date of Patent: Jan. 11, 2022

(54) USER-CONTROLLED AVAILABILITY OF VEHICLE CONNECTIVITY

(71) Applicant: GM GLOBAL TECHNOLOGY OPERATIONS LLC, Detroit, MI (US)

(72) Inventors: Mohammadreza AminiKashani, West Bloomfield, MI (US); Scott T. Droste, West Bloomfield, MI (US); David George, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 16/665,544

(22) Filed: Oct. 28, 2019

(65) Prior Publication Data

US 2021/0122312 A1   Apr. 29, 2021

(51) Int. Cl.
| | |
|---|---|
| *B60R 16/03* | (2006.01) |
| *G07C 5/00* | (2006.01) |
| *B60R 25/24* | (2013.01) |
| *H04W 4/40* | (2018.01) |
| *H04W 4/38* | (2018.01) |
| *G07C 5/08* | (2006.01) |

(52) U.S. Cl.
CPC .............. *B60R 16/03* (2013.01); *G07C 5/008* (2013.01); *G07C 5/08* (2013.01)

(58) Field of Classification Search
USPC ....................................................... 701/31.4
See application file for complete search history.

(56) References Cited

U.S. PATENT DOCUMENTS

| | | | | |
|---|---|---|---|---|
| 9,444,892 | B1* | 9/2016 | Amireddy | ............... H04L 51/18 |
| 2004/0193343 | A1* | 9/2004 | Tan | .................. G08G 1/096775 |
| | | | | 701/36 |
| 2006/0079203 | A1* | 4/2006 | Nicolini | ............... H04M 11/002 |
| | | | | 455/411 |
| 2007/0161355 | A1* | 7/2007 | Zeng | ..................... H04B 1/3805 |
| | | | | 455/99 |
| 2010/0120373 | A1* | 5/2010 | Wheatley | ................. H04L 12/12 |
| | | | | 455/68 |
| 2013/0265178 | A1* | 10/2013 | Tengler | ................... H04W 4/44 |
| | | | | 340/989 |
| 2014/0064257 | A1* | 3/2014 | Fontaine | ........... H04W 74/0891 |
| | | | | 370/336 |
| 2017/0285712 | A1* | 10/2017 | Veloso | .................. G06F 3/0488 |

(Continued)

*Primary Examiner* — Tyler D Paige
(74) *Attorney, Agent, or Firm* — Lorenz & Kopf LLP

(57) ABSTRACT

Methods, systems, and vehicles are provided for user-controlled availability of vehicle connectivity in various embodiments. In one exemplary embodiment, a plurality of sensors are configured to generate sensor data pertaining to a motor of a vehicle and pertaining to user inputs for a user of the vehicle; and a telematics system has a processor that is configured to at least facilitate: (i) determining, from the sensor data, whether the motor is turned off; (ii) determining, from the sensor data, whether a user has requested that the telematics unit operate in an energy conservation mode; and (iii) operating the telematics unit, using one or more adjusted values instead of one or more default values for communicating with a remote server, when it is determined that both the motor for the vehicle is turned off and the user has requested that the telematics unit operate in an energy conservation mode.

20 Claims, 3 Drawing Sheets

(56) References Cited

U.S. PATENT DOCUMENTS

2018/0063882 A1* 3/2018 MacDonald ............ H04W 4/70
2018/0285832 A1* 10/2018 Oz ......................... G07C 5/006
2020/0314752 A1* 10/2020 Haque ............... H04W 52/0216
2021/0122312 A1* 4/2021 AminiKashani ....... G07C 5/008

* cited by examiner

USER-CONTROLLED AVAILABILITY OF VEHICLE CONNECTIVITY

BACKGROUND

The technical field generally relates to vehicles, and more particularly relates to user control of availability of access to telematics units of vehicles.

Many vehicles today include telematics units that provide control and tracking of the vehicle and various functions thereof. Many vehicles also include the capability of a user of the vehicle to interact with the telematics unit in a remote manner, for example when the user is remote from or otherwise outside the vehicle. Accordingly, it may be desirable to provide improved methods and systems for allowing users to control the availability of vehicle connectivity, including the user's access to the telematics unit of the vehicle, for example for an extended period of time. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: (i) determining, from sensor data obtained via one or more sensors, whether a motor of a vehicle having a telematics unit is turned off; (ii) determining, from the sensor data, whether a user has requested that the telematics unit operate in an energy conservation mode; and (iii) operating the telematics unit, using one or more adjusted values instead of one or more default values for communicating with a remote server, when it is determined that both the motor for the vehicle is turned off and the user has requested that the telematics unit operate in an energy conservation mode.

Also in an exemplary embodiment, the method further includes: (i) determining, from the sensor data, wherein the motor has been turned back on; and (ii) operating the telematics unit, using one or more default values instead of the one or more adjusted values for communicating with the remote server, when it is determined that both the motor for the vehicle is turned back on.

Also in an exemplary embodiment, (i) the step of operating the telematics using the one or more adjusted values further includes operating the telematics unit in an enhanced coverage mode, when it is determined that both the motor for the vehicle is turned off and the user has requested that the telematics unit operate in the energy conservation mode; and (ii) the step of operating the telematics using the one or more default values further includes operating the telematics unit in a standard coverage mode, when it is determined that both the motor for the vehicle is turned back on.

Also in an exemplary embodiment, the method further includes: determining, from the sensor data, a requested duration of time for which the user requests connectivity to the telematics unit; and calculating the adjusted values based on the requested duration of time, such that sufficient energy is conserved so that the user maintains connectivity to the telematics unit for the requested duration of time.

Also in an exemplary embodiment, (i) the step of calculating the adjusted time includes calculating one or more discontinuous reception intervals for the telematics unit for communicating with the remote server while the telematics unit remains in an extended discontinuous reception energy saving mode of operation, such that sufficient energy is conserved so that the user maintains connectivity to the telematics unit for the requested duration of time; and (ii) the step of operation the telematics unit using the one or more adjusted values includes operating the telematics unit, using the one or more calculated discontinuous reception intervals, for communicating with the remote server, when it is determined that both the motor for the vehicle is turned off and the user has requested that the telematics unit operate in an energy conservation mode.

Also in an exemplary embodiment, (i) the step of calculating the adjusted time includes calculating one or more timers for time periods in which the remote server may communicate with the telematics unit while the telematics unit remains in an extended dormant state of operation, such that sufficient energy is conserved so that the user maintains connectivity to the telematics unit for the requested duration of time; and (ii) the step of operation the telematics unit using the one or more adjusted values includes operating the telematics unit, using the one or more calculated timers, for communicating with the remote server, when it is determined that both the motor for the vehicle is turned off and the user has requested that the telematics unit operate in an energy conservation mode.

Also in an exemplary embodiment, (i) the step of calculating the adjusted time includes calculating a T3324 active timer for the telematics unit monitoring for communications from the remote server; and (ii) the step of operation the telematics unit using the one or more adjusted values includes operating the telematics unit, using the calculated T3324 active timer, for communicating with the remote server, when it is determined that both the motor for the vehicle is turned off and the user has requested that the telematics unit operate in an energy conservation mode.

Also in an exemplary embodiment, (i) the step of calculating the adjusted time includes calculating a T3412 extended timer or T3512 timer for the telematics unit monitoring for communications from the remote server; and (ii) the step of operation the telematics unit using the one or more adjusted values includes operating the telematics unit, using the calculated T3412 extended timer or T3512 timer, for communicating with the remote server, when it is determined that both the motor for the vehicle is turned off and the user has requested that the telematics unit operate in an energy conservation mode.

In another exemplary embodiment, a system is disclosed that includes a plurality of sensors and a processor. The plurality of sensors are disposed onboard a vehicle having a motor and a telematics unit, and are configured to generate sensor data pertaining to a motor of the vehicle and user inputs for a user of the vehicle. The processor is coupled to the plurality of sensors and configured to at least facilitate: (i) determining, from the sensor data, sensors, whether the motor is turned off; (ii) determining, from the sensor data, whether a user has requested that the telematics unit operate in an energy conservation mode; and (iii) operating the telematics unit, using one or more adjusted values instead of one or more default values for communicating with a remote server, when it is determined that both the motor for the vehicle is turned off and the user has requested that the telematics unit operate in an energy conservation mode.

Also in one embodiment, the processor is further configured to at least facilitate: (i) determining, from the sensor data, wherein the motor has been turned back on; and (ii) operating the telematics unit, using one or more default values instead of the one or more adjusted values for communicating with the remote server, when it is determined that both the motor for the vehicle is turned back on.

Also in one embodiment, the processor is further configured to at least facilitate: (i) determining, from the sensor data, a requested duration of time for which the user requests connectivity to the telematics unit; and (ii) calculating the adjusted values based on the requested duration of time, such that sufficient energy is conserved so that the user maintains connectivity to the telematics unit for the requested duration of time.

Also in one embodiment, the processor is further configured to at least facilitate: (i) calculating one or more discontinuous reception intervals for the telematics unit for communicating with the remote server while the telematics unit remains in an extended discontinuous reception energy saving mode of operation, such that sufficient energy is conserved so that the user maintains connectivity to the telematics unit for the requested duration of time; and (ii) operating the telematics unit, using the one or more calculated discontinuous reception intervals, for communicating with the remote server, when it is determined that both the motor for the vehicle is turned off and the user has requested that the telematics unit operate in an energy conservation mode.

Also in one embodiment, the processor is further configured to at least facilitate: (i) calculating a T3324 active timer for communications between the telematics unit and the remote server while the telematics unit remains in an extended dormant state of operation, such that sufficient energy is conserved so that the user maintains connectivity to the telematics unit for the requested duration of time; and (ii) operating the telematics unit, using the T3324 active timer for communicating with the remote server, when it is determined that both the motor for the vehicle is turned off and the user has requested that the telematics unit operate in an energy conservation mode.

Also in one embodiment, the processor is further configured to at least facilitate: (i) calculating a T3412 extended timer or T3512 timer for communications between the telematics unit and the remote server while the telematics unit remains in an extended dormant state of operation, such that sufficient energy is conserved so that the user maintains connectivity to the telematics unit for the requested duration of time; and (ii) operating the telematics unit, using the T3412 extended timer or T3512 timer for communicating with the remote server, when it is determined that both the motor for the vehicle is turned off and the user has requested that the telematics unit operate in an energy conservation mode.

In another exemplary embodiment, a vehicle is provided that includes: a body; a motor disposed within the body; a plurality of sensors disposed onboard the vehicle, the plurality of sensors configured to generate sensor data pertaining to the motor and pertaining to user inputs for a user of the vehicle; and a telematics system disposed onboard the vehicle, the telematics system having a processor that is configured to at least facilitate: (i) determining, from the sensor data, sensors, whether the motor is turned off; (ii) determining, from the sensor data, whether a user has requested that the telematics unit operate in an energy conservation mode; and (iii) operating the telematics unit, using one or more adjusted values instead of one or more default values for communicating with a remote server, when it is determined that both the motor for the vehicle is turned off and the user has requested that the telematics unit operate in an energy conservation mode.

Also in one embodiment, the processor is further configured to at least facilitate: (i) determining, from the sensor data, wherein the motor has been turned back on; and (ii) operating the telematics unit, using one or more default values instead of the one or more adjusted values for communicating with the remote server, when it is determined that both the motor for the vehicle is turned back on.

Also in one embodiment, the processor is further configured to at least facilitate: (i) determining, from the sensor data, a requested duration of time for which the user requests connectivity to the telematics unit; and (ii) calculating the adjusted values based on the requested duration of time, such that sufficient energy is conserved so that the user maintains connectivity to the telematics unit for the requested duration of time.

Also in one embodiment, the processor is further configured to at least facilitate: (i) calculating one or more discontinuous reception intervals for the telematics unit for communicating with the remote server while the telematics unit remains in an extended discontinuous reception energy saving mode of operation, such that sufficient energy is conserved so that the user maintains connectivity to the telematics unit for the requested duration of time; and (ii) operating the telematics unit, using the one or more calculated discontinuous reception intervals, for communicating with the remote server, when it is determined that both the motor for the vehicle is turned off and the user has requested that the telematics unit operate in an energy conservation mode.

Also in one embodiment, the processor is further configured to at least facilitate: (i) calculating a T3324 active timer for communications between the telematics unit and the remote server while the telematics unit remains in an extended dormant state of operation, such that sufficient energy is conserved so that the user maintains connectivity to the telematics unit for the requested duration of time; and (ii) operating the telematics unit, using the T3324 active timer for communicating with the remote server, when it is determined that both the motor for the vehicle is turned off and the user has requested that the telematics unit operate in an energy conservation mode.

Also in one embodiment, the processor is further configured to at least facilitate: (i) calculating a T3412 extended timer or T3512 timer for communications between the telematics unit and the remote server while the telematics unit remains in an extended dormant state of operation, such that sufficient energy is conserved so that the user maintains connectivity to the telematics unit for the requested duration of time; and (ii) operating the telematics unit, using the T3412 extended timer or T3512 timer for communicating with the remote server, when it is determined that both the motor for the vehicle is turned off and the user has requested that the telematics unit operate in an energy conservation mode.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
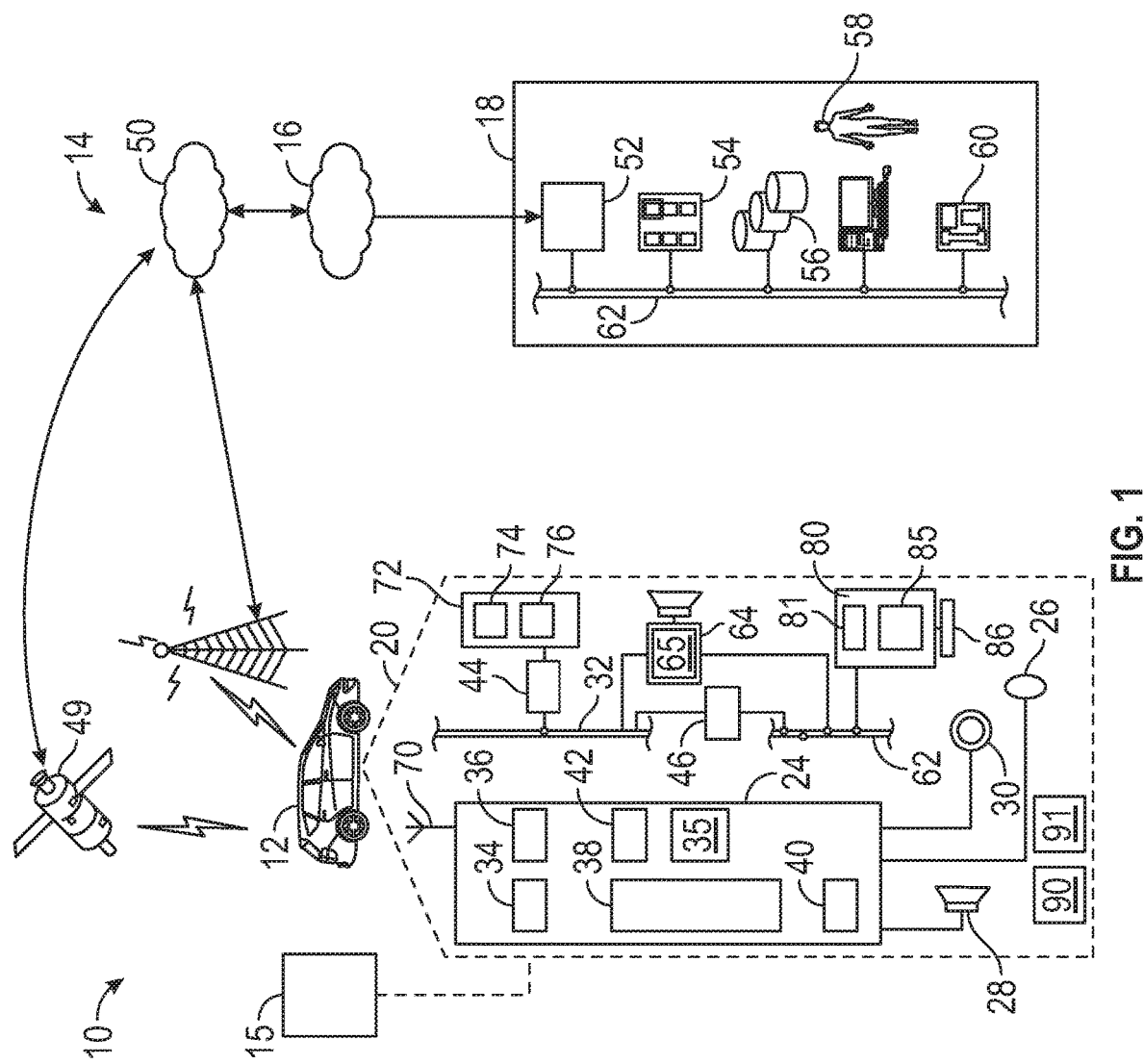
FIG. 1 is a functional block diagram of a communications system that includes a vehicle having a telematics unit, and that is configured to provide user-controlled connectivity to the vehicle, including the telematics unit thereof, for extended periods of time, in accordance with exemplary embodiments.

FIG. 1 is a functional block diagram of a communications system 10, in accordance with an exemplary embodiment. As described in greater detail further below, the communications system 10 generally includes a vehicle 12, along with one or more wireless carrier systems 14, one or more land networks 16, and one or more remote servers 18. As described in greater detail further below, in various embodiments, the communications system 10 provides for user-controlled connectivity with the vehicle 12.

It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, each vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. In various embodiments, the vehicle 12 has an engine (or motor) 90 that is started by an ignition system 91 (or other starting system). Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device, embedded within the vehicle 12, that provides a variety of services through its communication with the remote server 18, and generally includes an electronic processing device (processor) 38, one or more types of electronic memory 40, a cellular chipset/component 34, a transceiver 35, a wireless modem 36, a dual mode antenna 70, and a navigation unit containing a GPS chipset/component 42. In one example, the wireless modem 36 includes a computer program and/or set of software routines adapted to be executed within electronic processing device 38. Also in various embodiments, the transceiver 35 is configured to transmit, to one or more remote destinations (e.g., the remote server 18 of FIG. 1), data pertaining to the vehicle 12 (e.g., including roadway segments and lanes in which the vehicle 12 travels as well as a number of occupants in the vehicle 12) as the vehicle 12 travels through regulated roadways (e.g., toll roads, RUC roads, HOV lanes, and roads with designated parking areas).

In various embodiments, the telematics unit 24 is embedded and installed (and built-in) within the vehicle 12 at the time of manufacture. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including providing data pertaining to the vehicle 12, and operation, tracking, and control thereof (and of various components thereof). In various embodiments, the telematics unit 24 communicates with a user via an electronic device 15 (e.g., a smart phone), including when the user is remote from the vehicle 12. For example, in certain embodiments, the telematics unit 24 provides information regarding vehicle status, and/or the status of various vehicle components and systems, to the electronic device 15. Also in certain embodiments, the user provides instructions to the telematics unit 24, via the electronic device, for control over the vehicle 12 and/or various vehicle components and systems. In addition, in various embodiments, the telematics unit communicates with the remote server 18, for example in providing information regarding the vehicle 12, receiving information or instructions via the remote server 18, and/or implementing the user's instructions. Also in various embodiments, the telematics unit 24 obtains data pertaining to the vehicle 12's location (e.g., geographic location, or position) over time from the GPS chipset/component 42.

In addition, in various embodiments, the telematics unit 24 also obtains vehicle-related information from various vehicle sensors 72, connected to various sensor interface modules 44 are operatively connected to the vehicle bus 32. In various embodiments, the vehicle sensors 72 include ignition sensors 74 and user input sensors 76. In certain embodiments, the ignition sensors 74 detect when the engine (or motor) 90 of the vehicle is turned "on" or "off".

Also in certain embodiments, the input sensors 76 are utilized to detect inputs from the user with respect to operation of various vehicle components (e.g., in various embodiments, requests by the user to remotely start the vehicle 12 and/or an environmental control system thereof, requests as to a particular destination for travel for the vehicle 12, requests to connect with the telematics unit 24, and so on). In certain embodiments, the input sensors 76 are part of and/or coupled to the electronic device 15 (e.g., a smart phone, as noted above, or in some embodiments a keyfob or other electronic device) and/or one or more of the hardware components 20 and/or controls 30, and/or to one or more other vehicle modules 80, such as one or more engine control modules 81, display modules 85 (e.g., providing a status of the vehicle and/or components and/or systems thereof), and/or other control modules that control different functionality for the vehicle 12, that may be connected to one another and to telematics unit 24 via the communications bus 62. For example, in various embodiments, the input sensors 76 may be part of and/or coupled to controls 30 for the electronic device 15 and/or to one or more hardware components 20 and/or various input devices 86 for use with other vehicle modules 80, such as one or more touch screens, push buttons, dials, switches, knobs, levers, or the like.

In various embodiments, the vehicle sensors 72 may also include any number of other sensors, such as by way of example, wheel speed sensors, accelerometers, steering angle sensors, braking system sensors, gyroscopes, magnetometers, emission detection, and/or control sensors, and the like. Example sensor interface modules 44 include powertrain control, climate control, and body control, to name but a few.

In addition, in various embodiments, the telematics unit 24 may also provide other services, such as, by way of example: turn-by-turn directions and other navigation-related services provided in conjunction with the GPS chipset/component 42, emergency assistance services, information requests from the users of the vehicle 12 (e.g., regarding points of interest en route while the vehicle 12 is traveling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 14, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54 (e.g., including one or more processors), databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The transceivers 35, and/or modem or other telecommunication/computer equipment 60 may include an encoder, as previously explained, and can be connected to various devices such as a server 54 and database 56. In various embodiments, the database 56 of the remote server 18 comprises a computer memory that stores information, including default values of time intervals and timers used for the telematics unit 24's communications with the remote server. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data. In various embodiments, the transceiver 35 facilitates communications between the telematics unit 24 and both the user's electronic device 15 and the remote server 18.

Figure 2:
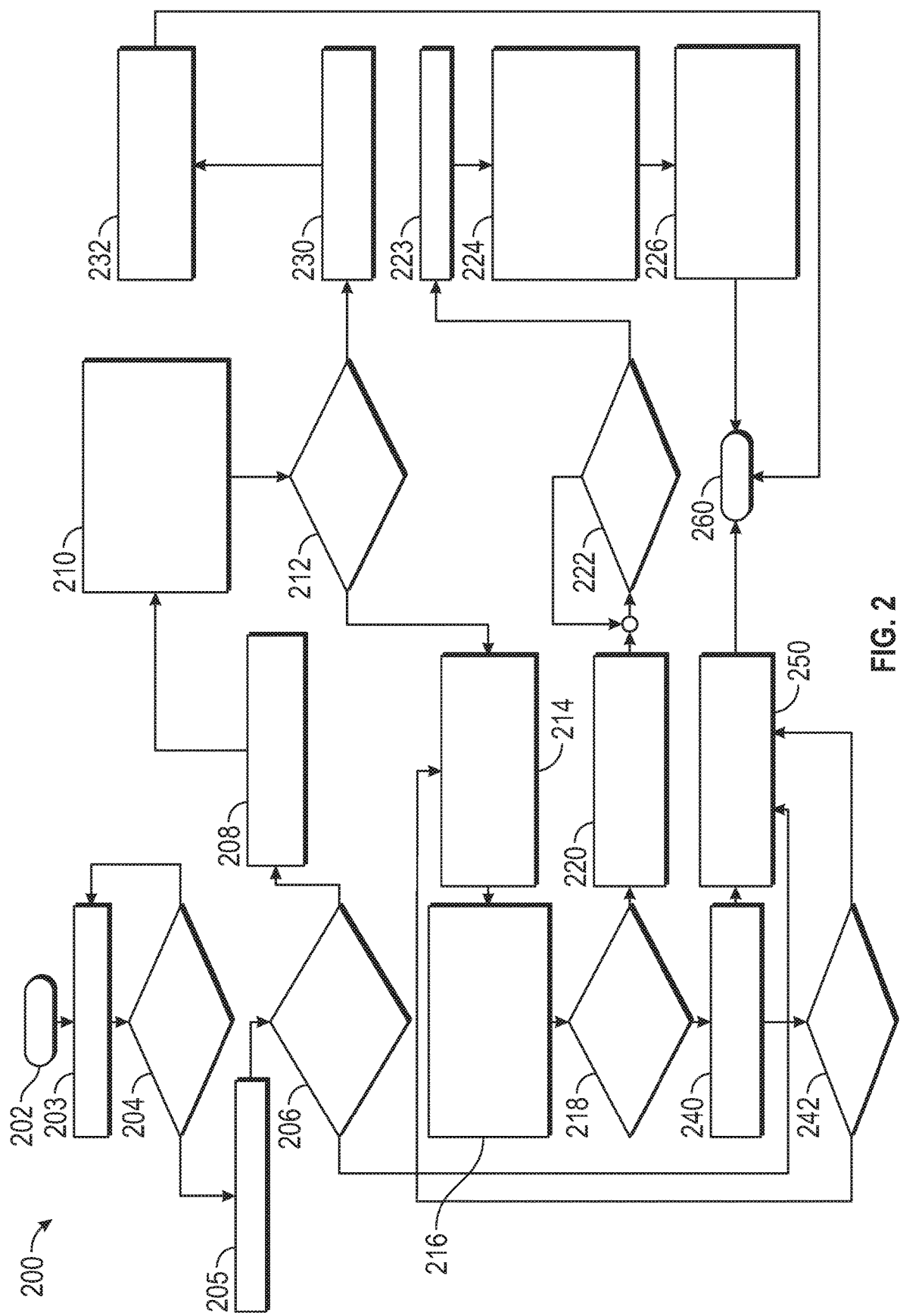
FIG. 2 is a flowchart of a process for providing user-controlled connectivity to the vehicle, including the telematics unit thereof, for extended periods of time, and that can be implemented in connection with the communications system and vehicle of FIG. 1, in accordance with exemplary embodiments.

FIG. 2 is a flowchart of a process 200 for providing user-controlled connectivity for the telematics unit 24 of the vehicle 10, in accordance with exemplary embodiments. In various embodiments, the process 200 can be used in connection with the communications system 10 of FIG. 1, including the vehicle 12 and the remote server 18 thereof, the components thereof of FIG. 1, and the modules thereof of FIG. 2, in accordance with exemplary embodiments.

As depicted in FIG. 2, in various embodiments the process 200 begins at step 202. In certain embodiments, the process 200 begins when the vehicle 12 is turned on and/or begins traveling, and/or when one or more users of the vehicle 12 approach or enter the vehicle 12, when a user request has been received, and/or when a user request and/or use of the vehicle 12 is expected. In certain other embodiments, the process embodiments, the steps of the process 200 are performed continuously during operation of the vehicle 12.

In various embodiments, vehicle sensor data is obtained at 203. In various embodiments, the vehicle sensor data is obtained from the ignition sensors 74 of FIG. 1 as to the status of the ignition system 91 for the engine (or motor 90) of the vehicle 12 is turned on.

Also in various embodiments, a determination is made at 204 as to whether the ignition of the vehicle is turned off. In various embodiments, this determination is made by a processor (such as the processor 38 of FIG. 1) as to whether the engine (or motor) 90 of FIG. 1 is presently in an "on" or "off" state, based on the sensor data obtained by the ignition sensors 74 of FIG. 1 at 203. It will be appreciated that in certain embodiments in which the motor 90 is turned "on" and "off" via a different starting system, then the determination may comprise a determination as to whether the motor 90 is presently in an "on" or "off" state based on sensor data from such different starting system, and so on.

If it is determined that the ignition is turned off (or, certain embodiments, that the motor's starting system is turned off), then the process proceeds to 205, described below. Conversely, if it is determined that the ignition is turned on, then the process returns to step 203, and steps 203-204 thereafter repeat until a determination is made in an iteration of step 204 that the ignition (or starting system) is turned off.

During 205, user inputs are obtained. In various embodiments, the user inputs include information provided from the user of the vehicle 12 as to the user's preferences and/or instructions for operation of the vehicle 12 and access to connectivity thereto (e.g., including connectivity to the telematics system 24). For example, in various embodiments, the user inputs may include information and/or instructions as to whether the user wishes to put the vehicle in an energy saving mode and/or an extended dormant/extended vacation mode (e.g., if the user does not plan on using or connecting to the vehicle 12 for an amount of time). Also in various embodiments, the user inputs may also include additional details as to the user's requests for connectivity to the vehicle 12 (or the telematics unit 24 thereof), for example including an expected number of days in which the user may desire connectivity to the vehicle 12 while the user is remote to the user, and so on. In various embodiments, the user inputs are obtained via the input sensors 76 of FIG. 1.

In various embodiments, a determination is made at 206 as to whether the user has placed the vehicle in an energy saving mode. In various embodiments, this determination is made by the processor 38 of FIG. 1 based on the information obtained via the sensor data of step 205 as obtained via the input sensors 76.

In various embodiments, if it is determined at 206 that the user has placed the vehicle in an energy saving mode, then the process proceeds to 208, as described below. Conversely, in various embodiments, if it is instead determined at 206 that the user has not placed the vehicle in an energy savings mode, then the process proceeds instead to step 250, described further below.

In various embodiments, at 208, one or more default values are recorded in connection with a remote network. Specifically, in certain embodiments, one or more default values are stored in the memory 40 of FIG. 1 with respect to the communications between the vehicle 12 (and, specifically, the telematics unit 24) thereof and the remote server 108 of FIG. 1. For example, in certain embodiments, a default time interval value is recorded with respect to an extended discontinuous reception (eDRX) mode in which the telematics unit 24 communicates with the remote server 108 (e.g., pertaining to how often the telematics unit 24 checks for information signals from the remote server 108 while the telematics unit 24 is in an energy conservation mode). By way of additional example, in certain embodiments, default values are recorded with respect to one or more timers (e.g., a T3324 Active Timer and/or a T3412 Extended Timer (e.g., 4G LTE) or T3512 Timer (e.g., 5G), as referred to in the field) that define times in which the telematics unit 24 will be reachable (or unreachable) with respect to inquiries from the remote server 108. In certain embodiments, in the absence of any signaling provided by the cellular network to convey a value for the T3412 Extended Timer or the T3512 Timer, the telematics unit will operate with the default value of T3412 (4G LTE) or T3512 (5G) defined in 3GPP TS 24.301 (4G LTE) or 3GPP TS 25.301 (5G NR), respectively. Also in certain embodiments, a non-default value may be provided to the telematics unit by the serving cellular network in the following standards-defined signaling messages: (1) ATTACH ACCEPT—4G LTE, 3GPP TS 24.301; (2) TRACKING AREA UPDATE ACCEPT—4G LTE, 3GPP TS 24.301; and (3) REGISTRATION ACCEPT—5G, 3GPP TS 25.301].

In addition, in various embodiments, at 210 a message is provided with a request to switch to utilize enhanced mode coverage. Specifically, in certain embodiments, a message is transmitted from the telematics unit 24 of the vehicle 12 to the remote server 108 of FIG. 1 to ascertain whether the remote server 108 can support the telematics unit 24's operation in an enhanced mode coverage. Also in various embodiments, this message is transmitted via the transceiver 35 of FIG. 1, in accordance with instructions provided by the process 38 of FIG. 1.

Also in various embodiments, a determination is made at 212 as to whether the enhanced mode request has been approved. In certain embodiments, during 212, the processor 38 of FIG. 1 determines whether the remote server 108 of FIG. 1 has provided a message approving the request for the enhanced mode request, based on a return message received from the remote server 108 via the transceiver 35 of FIG. 1.

If it is determined at 212 that the enhanced mode request has not been approved, then the process proceeds to 230, discussed further below. Conversely, if it is determined at 212 that the enhanced mode request has been approved, then the process proceeds to 214, described directly below.

During 214, values of one or more parameters for communications with the remote server are calculated based on user requests. Specifically, in certain embodiments, the processor 38 of FIG. 1 calculates one or more parameter values for communications with the remote server are calculated based on user requests received via the user inputs of 205, including the user's expression of a desired amount of time for which the user requests connectivity with the vehicle 12 (specifically, the telematics unit 24 thereof) before the user expects to be turning on the ignition 91 of FIG. 1 (or other starting system) of the engine (or motor) 90 of FIG. 1.

In one such embodiment, during 214, the processor 38 calculates a desired time interval value for the extended discontinuous reception (eDRX) mode, in which the telematics unit 24 communicates with the remote server 108 (e.g., pertaining to how often the telematics unit 24 checks for information signals from the remote server 108 while the telematics unit 24 is in an energy conservation mode), that will conserve sufficient energy such that the user will maintain connectivity with the telematics unit 24 for the requested amount of time before the user expects to be turning on the ignition 91 of FIG. 1 (or other starting system) of the engine (or motor) 90.

In another such embodiment, during 214, the processor 38 calculates desired values for the timers (e.g., a T3324 Active Timer and/or T3412 Extended Timer or T3512 Timer that define times in which the telematics unit 24 will be reachable (or unreachable) with respect to inquiries from the remote), that will conserve sufficient energy such that the user will maintain connectivity with the telematics unit 24 for the requested amount of time before the user expects to be turning on the ignition 91 of FIG. 1 (or other starting system) of the engine (or motor) 90.

Also in various embodiments, at 216, information is provided to the remote server with respect to the calculated values. Specifically, in various embodiments, the processor 38 of FIG. 1 directs the transceiver 35 of FIG. 1 to provide information, to the remote server 108 of FIG. 1, as to the calculated/proposed values for the time interval for the discontinuous reception (eDRX) mode and/or the timers for the remote server 108 as determined at 214. In certain embodiments, the information is provided via a 4G tracking area update and/or a 5G registration request message; however, this may vary in other embodiments.

Also in various embodiments, a determination is made at 218 as to whether the values requested at 216 have been approved. In certain embodiments, during 218, the processor 38 of FIG. 1 determines whether the remote server 108 of FIG. 1 has provided one or more messages approving the values for the time interval for the discontinuous reception (eDRX) mode and/or the timers for the remote server 108, based on one or more return messages received from the remote server 108 via the transceiver 35 of FIG. 1.

If it is determined at 218 that the proposed values of 216 have not been approved, then the process proceeds to 240, discussed further below. Conversely, if it is determined at 218 that the proposed values have been approved, then the process proceeds to 220, described directly below.

During 220, the telematics unit operates using the approved values. Specifically, in various embodiments, the telematics unit 24 operates, in accordance with instructions provided by the processor 38, utilizing the time intervals for communicating with the remote server 108 as calculated in 214 and approved at 218. For example, in certain embodiments, the telematics unit 24 operates during 220 using the time interval value for the extended discontinuous reception (eDRX) mode as calculated in 214 and approved at 218, such that the telematics unit 24 "wakes up" after each time interval to check for information signals from the remote server 108 while the telematics unit 24 is in an energy conservation mode. By way of additional example, in certain embodiments, the telematics unit 24 operates during 220 using the desired value for the timers (e.g., the T3324 Active Timer and/or T3412 Extended Timer or T3512 Timer) for communications with the remote server 108, such that the telematics unit 24 "wakes up" and is available for communications from the remote server 108 after the respective timers have elapsed.

In various embodiments, at 222, a determination is made as to whether the ignition of the vehicle is turned back on. In various embodiments, this determination is made by a processor (such as the processor 38 of FIG. 1) as to whether the engine (or motor) 90 of FIG. 1 is presently in an "on" or "off" state, based on the sensor data obtained by the ignition sensors 74 of FIG. 1 at 203. Similar to the discussion above with respect to step 204, it will be appreciated that in certain embodiments in which the motor 90 is turned "on" and "off" via a different starting system, then the determination may comprise a determination as to whether the motor 90 is presently in an "on" or "off" state based on sensor data from such different starting system, and so on.

If it is determined that the ignition is turned back on (or, certain embodiments, that the motor's starting system is turned back on), then the process proceeds to 223, described below. Conversely, if it is determined that the ignition is turned back on, then the telematics unit 24 continues operation in the manner of step 220 until a determination is made in an iteration of step 222 that the ignition (or starting system) is turned back on.

During step 223, updated values are determined for the communications with the remote server. Specifically, in various embodiments, the processor 38 determines updated values for the time interval for the discontinuous reception (eDRX) mode and/or the timers for the remote server 108, given that the ignition has been turned back on. In certain embodiments, the respective default values (i.e., from step 208, above) for the discontinuous reception (eDRX) mode and/or the timers for the remote server 108 are retrieved from the memory 40 and selected at step 223.

During 224, updated information is provided to the remote server with respect to the values previously reported at 216. Specifically, in various embodiments, the processor 38 of FIG. 1 directs the transceiver 35 of FIG. 1 to provide information, to the remote server 108 of FIG. 1, as to the updated values (e.g., the default values) for the time interval for the discontinuous reception (eDRX) mode and/or the timers for the remote server 108 as selected in 224. In certain embodiments, the information is provided via a 4G tracking area update and/or a 5G registration request message; however, this may vary in other embodiments.

In addition, in various embodiments, at 226, a message is provided with a request to switch to normal (or standard) mode. Specifically, in certain embodiments, a message is provided from the telematics unit 24 of the vehicle 12 to the remote server 108 of FIG. 1 to cease operation of the telematics unit 24 in enhanced coverage mode and switch to the normal (or standard) mode of operation. Also in various embodiments, this message is transmitted via the transceiver 35 of FIG. 1, in accordance with instructions provided by the process 38 of FIG. 1. In various embodiments, the process then terminates at 260.

With reference back to step 206, if it is instead determined at 206 that the user has not placed the vehicle in an energy savings mode, then the process proceeds to step 250, described directly below. During step 250, the telematics unit continues operation using its default values for communicating with the remote server. Specifically, in various embodiments, the telematics unit 24 operates, in accordance with instructions provided by the processor 38, utilizing the default values time intervals of step 208 (i.e., as stored in the memory 40) for communicating with the remote server 108. For example, in certain embodiments, the telematics unit 24 operates during 250 using the time default value for the interval value for the extended discontinuous reception (eDRX) mode from step 208. By way of additional example, in certain embodiments, the telematics unit 24 operates during 250 using the default values for the timers (e.g., the T3324 Active Timer and/or T3412 Extended Timer, or T3512 Timer) for communications with the remote server 108, from step 208. In various embodiments, the process then terminates at 260.

With reference back to step 212, if it is instead determined at 212 that the enhanced mode request has not been approved, then the user is notified at step 230. Specifically, in various embodiments, the telematics unit 24 provides a notification to the user (e.g., via a message transmitted via the receiver 35 to the user's electronic device 15) notifying the user that the request to use the enhanced mode has been rejected by the remote server 108. In various, embodiments, the process then proceeds to step 232, in which the telematics unit 24 continues operation using its default values for communicating with the remote server (i.e., similar to step 250, discussed above). In various embodiments, the process then terminates at 260.

With reference back to step 218, if it is instead determined at 218 that the proposed values of 216 have not been approved, then the user is notified at step 240. Specifically, in various embodiments, the telematics unit 24 provides a notification to the user (e.g., via a message transmitted via the receiver 35 to the user's electronic device 15) notifying the user that the requested values (i.e., corresponding to the user's requested duration of connectivity for the telematics unit of step 205, discussed above) have been rejected by the remote server 108.

In various, embodiments, the process then proceeds to step 242, in which the user is provided an opportunity to provide modified inputs with a modified duration of connectivity, and a determination is made (e.g., by the processor 38 of FIG. 1, using sensor data from the input sensors 76 of FIG. 1) as to whether the user has made a modified duration request.

If it is determined at 242 that the user has made a modified duration request, then in various embodiments the process returns to step 214, in which updated values for the time intervals and/or timers of step 214 are calculated and utilized based on the modified duration request of step 242, and steps 214-242 repeat using the calculated updated values for the time intervals and/or timers.

Conversely, if it is determined at 242 that the user has not made a modified duration request, then the process proceeds instead to the above-referenced step 250. As described above, during step 250, the telematics unit continues operation using its default values for communicating with the remote server. Specifically, in various embodiments, the telematics unit 24 operates, in accordance with instructions provided by the processor 38, utilizing the default values time intervals of step 208 (i.e., as stored in the memory 40) for communicating with the remote server 108. For example, in certain embodiments, the telematics unit 24 operates during 250 using the time default value for the interval value for the extended discontinuous reception (eDRX) mode from step 208. By way of additional example, in certain embodiments, the telematics unit 24 operates during 250 using the default values for the timers (e.g., the T3324 Active Timer and/or T3412 Extended Timer or T3512 Timer) for communications with the remote server 108, from step 208.

In various embodiments, the process then terminates at 260.

Figure 3:
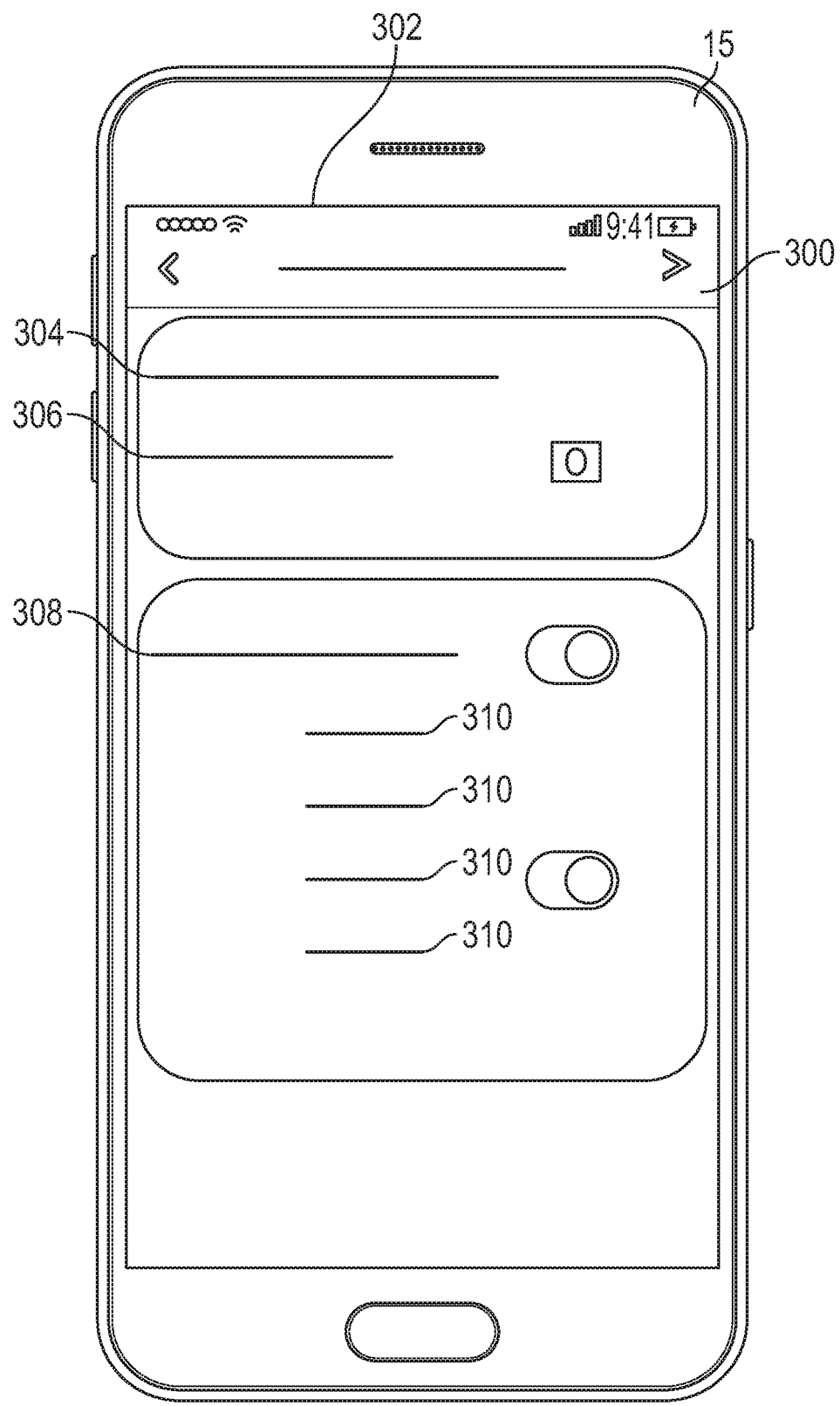
FIG. 3 is a schematics diagram of a user smart phone display for a user's control of connectivity to a vehicle, and that can be implemented in connection with the communications system and vehicle of FIG. 1 and the process of FIG. 2, in accordance with exemplary embodiments.

FIG. 3 is a schematic diagram of a user smart phone display 300 for a user's control of connectivity to a vehicle, in accordance with exemplary embodiments. In various embodiments, the smart phone display 300 of FIG. 3 can be implemented in connection with the communications system 10, vehicle 12, electronic device 15, and remote server 108 of FIG. 1, and the process 200 of FIG. 2, in accordance with exemplary embodiments.

As depicted in FIG. 3, in certain embodiments, the smart phone display 300 includes a heading 302 (e.g., "Remote Commands"), along with one or more mode descriptions 304, 306.

In the depicted embodiment, a first mode description 304 (e.g., "Extended Vacation Mode") pertains to a request by the user to place the telematics unit 24 in an extended dormant mode (or extended vacation mode) in which the user provides a requested duration of connectivity 306 (e.g., "Number of Days") before the user expects turning back on the ignition for the engine of the vehicle. In various embodiments, the selection of a requested duration for the extended vacation mode would be used in the process 200 to calculate values of the timers (e.g., the T3324 Active Timer and/or T3412 Extended Timer or T3512 Timer) for communications with the remote server 108, from step 208.

Also in the depicted embodiment, a second mode description 306 (e.g., "Energy Saving Mode") pertains to a request by the user to place the telematics unit 24 in an energy saving mode in which the user provides a requested duration of connectivity 310 (e.g., "Days") before the user expects turning back on the ignition for the engine of the vehicle (for example, for an extended amount of time, but not long enough to justify the extended vacation mode). In various embodiments, the selection of a requested duration for the energy saving mode be used in the process 200 to calculate values of the time interval value for the extended discontinuous reception (eDRX) mode for communications with the remote server 108. In certain embodiments, the user may choose to select between one of two available options for extending telematics unit communication availability based on his/her desired period for being able to reach the vehicle. For example, in certain embodiments, if the user has a desire to simply extend the period of availability while still maintaining the ability to reach the vehicle within a relatively short delay in connectivity, the user may select the "energy saving mode". However, in certain embodiments, if the user desires the ability to further extend the period of telematics unit availability, but is willing to accept an extended delay in reaching the vehicle, the user may select the "extended vacation mode" of operation. In addition, in certain embodiments, the selection of the mode of operation by the user may take the form of, but is not limited to: (1) through use of in-vehicle menu selection (for example, on the vehicle infotainment or radio system screen); and (2) through a smartphone connected app that communicates with the telematics unit.

Accordingly, in accordance with various embodiments, methods and systems are provided for providing user control of connectivity with a telematics unit of the vehicle. Specifically, in various embodiments, the user is permitted to select an amount of time for which the user requests to maintain connectivity with the telematics unit before re-starting the ignition of the vehicle (e.g., when the user is on vacation or otherwise does not intend to re-start the ignition for an extended period of time). Also in various embodiments, the methods and systems calculate respective values for communications with a remote server (e.g., including, in certain embodiments, a time interval value for the extended discontinuous reception (eDRX) mode and/or timers (e.g., the T3324 Active Timer and/or T3412 Extended Timer or T3512 Timer) for communications with the remote server 108), to thereby further conserve energy and provide the user with extended connectivity with the telematics unit 24 of the vehicle 12 in accordance with the user's request.

It will be appreciated that the systems and methods may vary from those depicted in the Figures and described herein. For example, the communications system of FIG. 1, including the vehicle, the remote server, the communications networks, and/or components thereof, may vary from that depicted in FIG. 1 and/or described herein, in various embodiments. It will similarly be appreciated that the process (and/or subprocesses) disclosed herein may differ from those described herein and/or depicted in FIG. 2, and/or that steps thereof may be performed simultaneously and/or in a different order as described herein and/or depicted in FIG. 2, among other possible variations. It will also be appreciated that the exemplary display of FIG. 3 may also vary in different embodiments.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method for adjusting communications between a telematics unit of a vehicle and a remote server, the method comprising:
   determining, from sensor data obtained via one or more sensors, whether a motor of the vehicle having the telematics unit is turned off;
   determining, from the sensor data, whether a user has requested that the telematics unit operate in an energy conservation mode; and
   operating the telematics unit, using one or more adjusted values for a duration of a timer for performing tracking or registration, or both, with respect to a cellular network for communications with the remote server instead of one or more predetermined default values stored in a computer memory, for communicating with the remote server, such that an extended duration for the timer is utilized for the communications between the telematics unit of the vehicle and the remote server, thereby causing the telematics unit to remain in an extended dormant state of operation, when it is determined that both the motor for the vehicle is turned off and the user has requested that the telematics unit operate in an energy conservation mode.

2. The method of claim 1, further comprising:
   determining, from the sensor data, wherein the motor has been turned back on; and
   operating the telematics unit, using the one or more predetermined default values stored in the computer memory instead of the one or more adjusted values for communicating with the remote server, when it is determined that both the motor for the vehicle is turned back on.

3. The method of claim 2, wherein:
   the step of operating the telematics using the one or more adjusted values further comprises operating the telematics unit in an enhanced coverage mode, when it is determined that both the motor for the vehicle is turned off and the user has requested that the telematics unit operate in the energy conservation mode; and
   the step of operating the telematics using the one or more default values further comprises operating the telematics unit in a standard coverage mode, when it is determined that the motor for the vehicle is turned back on.

4. The method of claim 1, further comprising:
   determining, from the sensor data, a requested duration of time for which the user requests connectivity to the telematics unit; and
   calculating the adjusted values based on the requested duration of time, such that sufficient energy is conserved so that the user maintains connectivity to the telematics unit for the requested duration of time.

5. The method of claim 4, wherein:
   the step of calculating the adjusted time comprises calculating one or more discontinuous reception intervals for the telematics unit for communicating with the remote server while the telematics unit remains in an extended discontinuous reception energy saving mode of operation, such that sufficient energy is conserved so that the user maintains connectivity to the telematics unit for the requested duration of time; and
   the step of operation the telematics unit using the one or more adjusted values further comprises operating the telematics unit, using the one or more calculated discontinuous reception intervals, for communicating with the remote server, when it is determined that both the motor for the vehicle is turned off and the user has requested that the telematics unit operate in an energy conservation mode.

6. The method of claim 1, wherein the step of operating the telematics unit comprises:
   operating the telematics unit, including performing a tracking area update, a registration procedure, or both, with respect to the cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

7. The method of claim 6, wherein the step of operating the telematics unit comprises:
   operating the telematics unit, including performing the tracking area update with respect to the cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

8. The method of claim 7, wherein the cellular network comprises a 4G cellular network, and step of operating the telematics unit comprises:
operating the telematics unit, including performing the tracking area update with respect to the 4G cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

9. The method of claim 6, wherein the step of operating the telematics unit comprises:
operating the telematics unit, including performing the registration procedure with respect to the cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

10. The method of claim 9, wherein the cellular network comprises a 5G cellular network, and step of operating the telematics unit comprises:
operating the telematics unit, including performing the registration procedure with respect to the 5G cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

11. A system for adjusting communications between a telematics unit of a vehicle and a remote server, the system comprising:
a plurality of sensors disposed onboard the vehicle having a motor and the telematics unit, and configured to generate sensor data pertaining to the motor of the vehicle and user inputs for a user of the vehicle; and
a processor coupled to the plurality of sensors and configured to at least facilitate:
determining, from the sensor data, whether the motor is turned off;
determining, from the sensor data, whether a user has requested that the telematics unit operate in an energy conservation mode; and
operating the telematics unit, using one or more adjusted values for a duration of a timer for performing tracking or registration, or both, with respect to a cellular network for communications with the remote server instead of one or more predetermined default values stored in a computer memory, for communicating with the remote server, such that an extended duration for the timer is utilized for the communications between the telematics unit of the vehicle and the remote server, thereby causing the telematics unit to remain in an extended dormant state of operation, when it is determined that both the motor for the vehicle is turned off and the user has requested that the telematics unit operate in an energy conservation mode.

12. The system of claim 11, wherein the processor is further configured to at least facilitate:
determining, from the sensor data, wherein the motor has been turned back on; and
operating the telematics unit, using one or more predetermined default values stored in the computer memory instead of the one or more adjusted values for communicating with the remote server, when it is determined that both the motor for the vehicle is turned back on.

13. The system of claim 11, wherein the processor is further configured to at least facilitate:
determining, from the sensor data, a requested duration of time for which the user requests connectivity to the telematics unit; and
calculating the adjusted values based on the requested duration of time, such that sufficient energy is conserved so that the user maintains connectivity to the telematics unit for the requested duration of time.

14. The system of claim 13, wherein the processor is further configured to at least facilitate:
calculating one or more discontinuous reception intervals for the telematics unit for communicating with the remote server while the telematics unit remains in an extended discontinuous reception energy saving mode of operation, such that sufficient energy is conserved so that the user maintains connectivity to the telematics unit for the requested duration of time; and
operating the telematics unit, using the one or more calculated discontinuous reception intervals, for communicating with the remote server, when it is determined that both the motor for the vehicle is turned off and the user has requested that the telematics unit operate in an energy conservation mode.

15. A vehicle featuring adjusted communications with a remote server, the vehicle comprising:
a body;
a motor disposed within the body;
a plurality of sensors disposed onboard the vehicle, the plurality of sensors configured to generate sensor data pertaining to the motor and pertaining to user inputs for a user of the vehicle; and
a telematics system disposed onboard the vehicle, the telematics system having a processor that is configured to at least facilitate:
determining, from the sensor data, whether the motor is turned off;
determining, from the sensor data, whether a user has requested that the telematics unit operate in an energy conservation mode; and
operating the telematics unit for a duration of a timer for performing tracking or registration, or both, with respect to a cellular network for communications with the remote server, using one or more adjusted values instead of one or more predetermined default values stored in a computer memory, for communicating with a remote server, such that an extended duration for the timer is utilized for the communications between the telematics unit of the vehicle and the remote server, thereby causing the telematics unit to remain in an extended dormant state of operation, when it is determined that both the motor for the vehicle is turned off and the user has requested that the telematics unit operate in an energy conservation mode.

16. The vehicle of claim 15, wherein the processor is further configured to at least facilitate:
  determining, from the sensor data, wherein the motor has been turned back on; and
  operating the telematics unit, using one or more predetermined default values stored in the computer memory instead of the one or more adjusted values for communicating with the remote server, when it is determined that both the motor for the vehicle is turned back on.

17. The vehicle of claim 15, wherein the processor is further configured to at least facilitate:
  determining, from the sensor data, a requested duration of time for which the user requests connectivity to the telematics unit; and
  calculating the adjusted values based on the requested duration of time, such that sufficient energy is conserved so that the user maintains connectivity to the telematics unit for the requested duration of time.

18. The vehicle of claim 17, wherein the processor is further configured to at least facilitate:
  calculating one or more discontinuous reception intervals for the telematics unit for communicating with the remote server while the telematics unit remains in an extended discontinuous reception energy saving mode of operation, such that sufficient energy is conserved so that the user maintains connectivity to the telematics unit for the requested duration of time; and
  operating the telematics unit, using the one or more calculated discontinuous reception intervals, for communicating with the remote server, when it is determined that both the motor for the vehicle is turned off and the user has requested that the telematics unit operate in an energy conservation mode.

19. The vehicle of claim 15, wherein the processor is further configured to at least facilitate operating the telematics unit, including performing a tracking area update with respect to the cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

20. The vehicle of claim 15, wherein the processor is further configured to at least facilitate operating the telematics unit, including performing a registration procedure with respect to a cellular network for communications with the remote server, using the extended duration for the timer, thereby causing the telematics unit to remain in an extended dormant state of operation, when it is determined that both the motor for the vehicle is turned off and the user has requested that the telematics unit operate in an energy conservation mode.

* * * * *